United States Patent
Kotake (10) Patent No.: US 8,873,088 B2
(45) Date of Patent: Oct. 28, 2014

(54) PRINTING CONTROL DEVICE EXTRACTING DATA FOR CONSTITUTING DUPLICATION OBJECTS, PRINTING CONTROL METHOD EXTRACTING DATA FOR CONSTITUTING DUPLICATION OBJECTS, AND NON-TRANSITORY COMPUTER READABLE MEDIUM

(75) Inventor: Kanako Kotake, Toyokawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 79 days.

(21) Appl. No.: 13/070,878

(22) Filed: Mar. 24, 2011

(65) Prior Publication Data

US 2011/0292440 A1    Dec. 1, 2011

(30) Foreign Application Priority Data

May 28, 2010    (JP) ................................. 2010-122767

(51) Int. Cl.
    *G06F 3/12*    (2006.01)

(52) U.S. Cl.
    CPC ............ *G06F 3/1206* (2013.01); *G06F 3/1285* (2013.01); *G06F 3/1244* (2013.01)
    USPC ......... 358/1.15; 358/505; 358/1.11; 358/538; 358/448; 358/462

(58) Field of Classification Search
    CPC ... G06F 3/1206; G06F 3/1244; G06F 3/1285; G06F 3/1246
    USPC ................ 358/1.15, 505, 1.11, 538, 448, 462
    See application file for complete search history.

(56) References Cited

U.S. PATENT DOCUMENTS

| 6,230,143 | B1 * | 5/2001 | Simons et al. ............. 705/14.25 |
| 7,010,551 | B2 * | 3/2006 | Terayama et al. ................ 1/1 |
| 7,231,357 | B1 * | 6/2007 | Shanman et al. .......... 705/14.23 |
| 7,286,248 | B2 * | 10/2007 | Aboujaoude et al. ........ 358/1.13 |

(Continued)

FOREIGN PATENT DOCUMENTS

| CN | 1733495 A | 2/2006 |
| CN | 1790313 A | 6/2006 |

(Continued)

OTHER PUBLICATIONS

State Intellectual Property Office of the People's Republic of China, Notification of First Office Action for Chinese Patent Application No. 201110070366.2, mailed Jun. 6, 2013.
State Intellectual Property Office of the People's Republic of China, Notification of Second Office Action for Chinese Patent Application No. 201110070366.2, mailed Dec. 17, 2013.
State Intellectual Property Office of the People's Republic of China, Notification of Third Office Action for Chinese Patent Application No. 201110070366.2, mailed Jun. 5, 2014.

*Primary Examiner* — Benny Q Tieu
*Assistant Examiner* — Quyen V Ngo
(74) *Attorney, Agent, or Firm* — Baker Botts L.L.P.

(57) ABSTRACT

A printing control device includes a web page data acquiring portion configured to acquire web page data of a prescribed web page from the web server and a display configured to display the prescribed web page. The printing control device further includes an extraction portion configured to extract data for constituting a duplication object. The printing control device still further includes a print data creation portion configured to create print data for forming at least two duplicated images of the duplication object based on the extracted data. Moreover, the printing control device includes a printing instruction portion configured to instruct the printing unit to form an image on the recording medium based on the created print data.

16 Claims, 5 Drawing Sheets

(56) References Cited

U.S. PATENT DOCUMENTS

| | | | |
|---|---|---|---|
| 8,120,800 B2* | 2/2012 | Kim et al. | 358/1.15 |
| 8,296,652 B2* | 10/2012 | Ko et al. | 715/274 |
| 2002/0057452 A1* | 5/2002 | Yoshino | 358/1.15 |
| 2002/0097435 A1 | 7/2002 | Aboujaoude et al. | |
| 2006/0023247 A1 | 2/2006 | Yamakawa | |
| 2006/0132841 A1 | 6/2006 | Park et al. | |
| 2006/0164679 A1 | 7/2006 | Kim et al. | |
| 2008/0097837 A1* | 4/2008 | Jacobson | 705/14 |
| 2008/0101651 A1* | 5/2008 | Matsunoshita | 382/100 |
| 2008/0262928 A1* | 10/2008 | Michaelis | 705/14 |
| 2009/0193336 A1 | 7/2009 | Ko et al. | |
| 2010/0281351 A1* | 11/2010 | Mohammed | 715/205 |

FOREIGN PATENT DOCUMENTS

| | | |
|---|---|---|
| CN | 1811694 A | 8/2006 |
| JP | 2001-142948 A | 5/2001 |
| JP | 2002-092451 A | 3/2002 |
| JP | 2002-352131 A | 12/2002 |

* cited by examiner

```
..........
54(54a) ―― <!--COUPON-->
         ┌ <div class="space20">
         │ ........
         │ ...... COURSE ..
      56 ┤ ..... 5000YEN→4000YEN ......
         │ ..... EFFECTIVE PERIOD  20xx/xx/xx
         │ ......
         └ </div>
54(54b) ―― <!-- /COUPON-->

54(54a) ―― <!-- MAP -->
         ┌ <div class="space20">....
      58 ┤ ......map.gif.....
         │ ..........
         └ </div>
54(54b) ―― <!-- /MAP -->
..........
```

Fig. 3B

| STORE TYPE | KEY WORDS | FREQUENCY |
|---|---|---|
| SUPERMARKET | FRESH FOODS, COOKIES | 5 / WEEK |
| DRUGSTORE | MEDICINE, COSMETICS | 2 / MONTH |
| MOVIE THEATER | MOVIE, THEATER | 1 / MONTH |
| BEAUTY SALON | CUT, COLORING, PERM | 5 / YEAR |
| RESTAURANT | MENU, DISHES, COURSE | 1 / MONTH |

PRINTING CONTROL DEVICE EXTRACTING DATA FOR CONSTITUTING DUPLICATION OBJECTS, PRINTING CONTROL METHOD EXTRACTING DATA FOR CONSTITUTING DUPLICATION OBJECTS, AND NON-TRANSITORY COMPUTER READABLE MEDIUM

CROSS REFERENCE TO RELATED APPLICATION

The present application claims priority from Japanese Patent Application No. 2010-122767, filed on May 28, 2010, the disclosure of which is incorporated herein by reference in its entirely.

BACKGROUND

1. Technical Field

The present invention relates to a printing control device and a printing control method.

2. Related Art

A technique of issuing coupons on the Internet has been known. For example, when a banner advertisement displayed at a specific web page on the Internet is clicked, a leaflet screen image is displayed which has a description portion of merchandise information such as merchandise photos and prices, and a description portion of bonus information such as coupons and service tickets. Then, when a user prints out the displayed leaflet screen image and brings the image to a store, the user can acquire a bonus described on the leaflet screen image.

For example, when a user frequently uses the facility of a coupon issuer, the user may use the same bonus multiple times.

However, in using the same bonus multiple times, the known technique is inconvenient for users because they must print out a leaflet screen image, on which a coupon is described, multiple times.

Such an inconvenience may occur not only in coupons but also in various types of information displayed on a web page. For example, a user may want to print out, multiple times, only image data such as photos and characters displayed on a web page or text data such as news and quizzes displayed on a web page. In such a case, the user must print out, multiple times, a web page on which the image data or text data is displayed. It is inconvenient for the user to operate a printer or a personal computer connected to a printer for multiple times.

SUMMARY

A need has arisen to provide a printing control device, a printing control method and a non-transitory computer readable medium which may improve convenience in printing a web page.

According to an embodiment of the present invention, a printing control device for controlling a printing unit that forms an image on a recording medium comprises a web page data acquiring portion configured to access to a web server on a network and acquire web page data of a prescribed web page from the web server. The printing control device further comprises a display configured to display the prescribed web page based on the web page data acquired from the web server. The printing control device still further comprises an object determination portion configured to determine whether or not the prescribed web page displayed by the display includes a duplication object which is an object to be duplicated. The printing control device yet further comprises a first extraction portion configured to extract data for constituting the duplication object when the object determination portion determines that the prescribed web page includes the duplication object. Moreover, the printing control device comprises a print data creation portion configured to create print data for forming at least two duplicated images of the duplication object on the identical recording medium based on the data extracted by the first extraction portion. The printing control device further comprises a printing instruction portion configured to instruct the printing unit to form an image on the recording medium based on the print data created by the print data creation portion.

According to an embodiment of the invention, a printing control method for controlling a printing unit that forms an image on a recording medium comprises a step of accessing to a web server on a network and acquiring web page data of a prescribed web page from the web server. The printing control method further comprises a step of displaying, on a display, the prescribed web page based on the web page data acquired from the web server. The printing control method still further comprises a step of determining whether or not the prescribed web page displayed on the display includes a duplication object which is an object to be duplicated. The printing control method yet further comprises a step of extracting data for constituting the duplication object when it is determined, in the step of determining, that the prescribed web page includes the duplication object. Moreover, the printing control method comprises a step of creating print data for forming at least two duplicated images of the duplication object on the identical recording medium based on the extracted data. The printing control method further comprises a step of instructing the printing unit to form an image on the recording medium based on the print data created in the step of creating.

According to an embodiment of the invention, a non-transitory computer readable medium storing a computer program which causes, if executed, a processor of a printing control device to perform following steps. The steps comprise a step of accessing to a web server on a network and acquiring web page data of a prescribed web page from the web server. The steps further comprise a step of displaying, on a display, the prescribed web page based on the web page data acquired from the web server. The steps still further comprise a step of determining whether or not the prescribed web page displayed on the display includes a duplication object which is an object to be duplicated. The steps yet further comprise a step of extracting data for constituting the duplication object when it is determined, in the step of determining, that the prescribed web page includes the duplication object. Moreover, the steps comprise a step of creating print data for forming at least two duplicated images of the duplication object on the identical recording medium based on the extracted data. The steps further comprise a step of instructing the printing unit to form an image on the recording medium based on the print data created in the step of creating.

BRIEF DESCRIPTION OF THE DRAWINGS

For a more complete understanding of the present invention, the needs satisfied thereby, and the features and advantages thereof, reference now is made to the following descriptions taken in connection with the accompanying drawings wherein.

DESCRIPTION OF THE PREFERRED EMBODIMENTS

Figure 1:
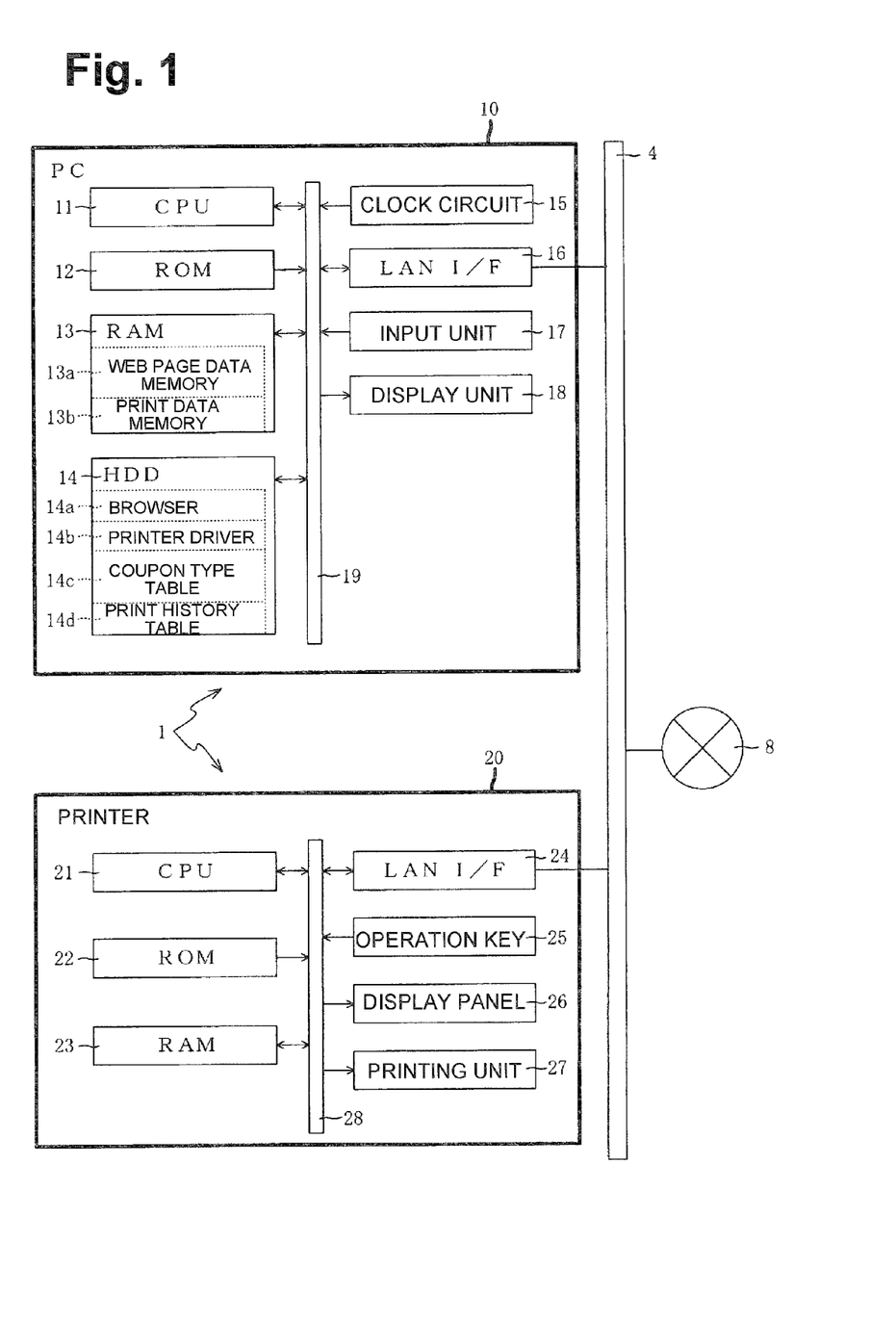
FIG. 1 is a block diagram showing an electrical configuration of a PC installed with a printer driver, and a printing system including the PC according to an embodiment of the present invention.

Embodiments of the invention and their features and advantages may be understood by referring to FIGS. 1-4B, like numerals being used for like corresponding parts in the various drawings. Preferred embodiments of the present invention will be described below with reference to the accompanying drawings. FIG. 1 shows a block diagram of a personal computer 10, hereinafter referred to as a PC 10, installed with a printer driver 14b (an example of a printing control program), and a printing system 1 including the PC 10 (an example of a printing control device). The printing system 1 includes a LAN network 4, the PC 10 and a printer 20 (an example of a printing unit). The number of the PCs 10, the printers 20 and the like included in the printing system 1 may be changed as needed.

The LAN network 4 is connected with the Internet 8 (an example of a network) through a router (not shown). The PC 10 according to the present embodiment improves convenience in printing a web page.

The PC 10 mainly has a CPU 11, a ROM 12, a RAM 13, a hard disk drive 14, hereinafter referred to as an HDD 14, a clock circuit 15, a LAN interface 16, hereinafter referred to as a LAN I/F 16, an input unit 17, and a display unit 18, which are connected with one another through a bus line 19.

The CPU 11 (an example of a processor) controls each component connected through the bus line 19 according to a fixed value or a program stored in the ROM 12 or the HDD 14. The ROM 12 is a memory that stores a program or the like for controlling the operation of the PC 10, while the RAM 13 is a readable/writable memory for temporarily storing data required for CPU 11 processing.

The RAM 13 includes a web page data memory 13a and a print data memory 13b. The PC 10 gains access to a web server (not shown) through the Internet 8 and stores web page data acquired from the web server into the web page data memory 13a. In the present embodiment, "web page data" includes HTML data that is a source code of a web page and an image file corresponding to an image embedded into the web page. The PC 10 displays the web page on the display unit 18, based on the web page data stored in the web page data memory 13a. The print data memory 13b stores print data to be created based on the web page data. In the present embodiment, "print data" is formed in a page description language for controlling the printer 20.

The HDD 14 is a hard disk drive and includes a browser application 14a, hereinafter referred to as a browser 14a, the printer driver 14b, a coupon type table 14c, and a print history table 14d (an example of a history storage portion). By executing the browser 14a, the PC 10 functions as a web page display device that gains access to a web server on the Internet 8 and displays a web page based on web page data acquired from the web server.

The printer driver 14b is a program for controlling the printer 20. By executing the printer driver 14b, the CPU 11 executes a coupon printing process (FIGS. 4A and 4B), which will be described later. The coupon type table 14c is a table used to calculate the number of coupons 50 (FIGS. 2A to 2C) formed by the printer 20, which will be described later in detail with reference to FIG. 3B. The print history table 14d is a table that stores a print history based on a web page.

The clock circuit 15 is a circuit that clocks a current time (including date). The LAN I/F 16 connects the PC 10 with the LAN network 4. The input unit 17 inputs instructions and information into the PC 10. The display unit 18 (an example of a display) displays various types of information such as a web page.

The printer 20 may be a laser printer that forms an image on a recording medium based on print data output from the PC 10. The printer 20 may be another type of printer, including an ink jet type and a thermal transfer type.

The printer 20 mainly has a CPU 21, a ROM 22, a RAM 23, a LAN interface 24, hereinafter referred to as a LAN I/F 24, an operation key 25, a display panel 26, and a printing unit 27, which are connected with one another through a bus line 28.

The CPU 21 executes various types of processes according to a program stored in the ROM 22. The ROM 22 is a memory that stores a program for controlling the operation of the printer 20. The RAM 23 is a readable/writable memory for temporarily storing data required for CPU 21 processing.

The operation key 25 inputs instructions and information into the printer 20. The display panel 26 is a display unit capable of displaying various types of information. The printing unit 27 forms an image on a recording medium based on print data output from the PC 10.

Figure 2A:
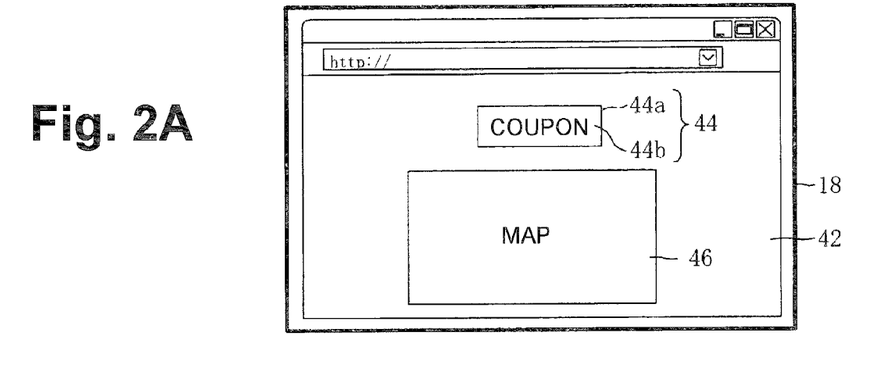
FIG. 2A is a diagram showing an example of a state in which a web page is displayed on a display unit of the PC.
Figure 2B:
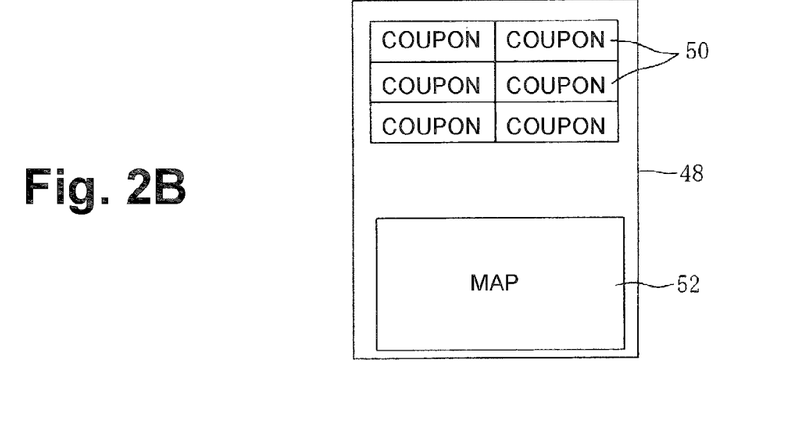
FIGS. 2B and 2C are diagrams showing an example of an image formed on a recording medium by a printer in executing a coupon printing process with the web page shown in FIG. 2A as an object to be printed.
Figure 2C:
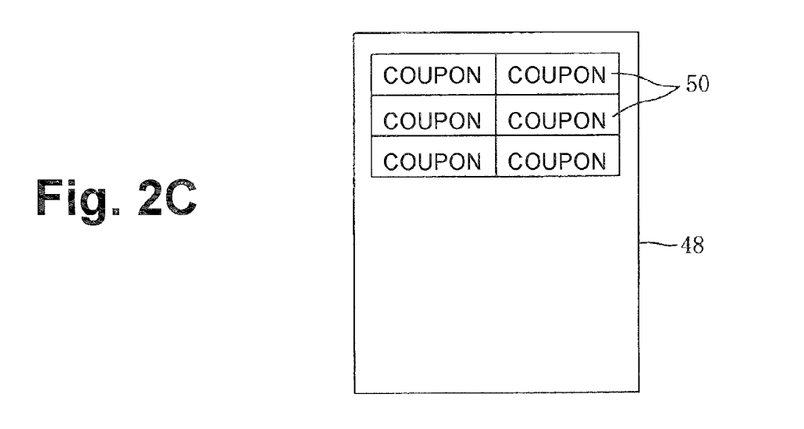

Referring to FIGS. 2A to 2C, the outline of a coupon printing process executed by the PC 10 will be described. FIG. 2A is a diagram showing an example of a state in which a web page 42 is displayed on the display unit 18 of the PC 10. In an example shown in FIG. 2A, the web page 42 displayed on the display unit 18 includes a coupon object 44 (an example of a duplication object) and a map object 46 (an example of a related object). The web page 42 may include other information in addition to the coupon object 44 and the map object 46.

The coupon object 44 is formed from a frame line 44a and a text 44b, for example. A user causes the printer 20 to print out the web page 42, so as to form a duplicated image of the coupon object 44 on a recording medium. When the user cuts off the duplicated image of the coupon object 44 from the recording medium and presents the image to a commercial facility or the like as a coupon, the user can receive a bonus or service predetermined on the coupon. The text 44b of the coupon object 44 describes the content, store name, and effective period of a bonus and service, for example; however, FIGS. 2A to 2C show a "coupon" as an example of the text 44b for simplification of drawings.

The map object 46 is a map image showing the location of a commercial facility where the coupon may be used, namely, the commercial facility of a coupon issuer. However, FIGS. 2A and 2B have no illustration of a map in the map object 46 for simplification of drawings.

FIG. 2B is a diagram showing an example of an image formed on a recording medium 48 by the printer 20 in executing a coupon printing process (FIGS. 4A and 4B) with the web page 42 shown in FIG. 2A as an object to be printed. As shown in FIG. 2B, the PC 10 according to the present embodiment creates print data so that at least two duplicated images 50, hereinafter referred to as the coupon 50, of the coupon object 44 are formed on the identical recording medium 48, and causes the printer 20 to form an image based on the print data. In this way, the user can obtain from one recording medium 48 a larger number of coupons 50 than the number of the coupon objects 44 included in the web page 42. Therefore, convenience in printing the web page 42 becomes higher than in printing the web page 42 each time the coupon 50 is required, thus cutting down usage of color materials such as ink and tonner and consumables such as the recording medium 48. Moreover, the web page 42 may include information with low necessity of printing for users, such as description portions of merchandise information. Therefore, when only one coupon 50 is obtained from one recording medium 48, a user must repeat printing of the web page 42 each time the coupon 50 becomes required and must concurrently print out the information with low necessity as well, thus wasting color materials such as ink and tonner and the recording medium 48. On the other hand, according to the present embodiment, the user can obtain at least two coupons 50 from one recording medium 48, thereby to avoid wasting consumables.

In addition, the PC 10 creates print data for forming at least two coupons 50 and a duplicated image 52 of the map object 46, hereinafter referred to as a map 52, on the identical recording medium 48, and causes the printer 20 to form an image based on the print data. Accordingly, the user can acquire a plurality of coupons 50 and the map 52 from one recording medium 48, thus attaining high convenience in printing the web page 42.

The PC 10 according to the present embodiment has the print history table 14*d* that stores a print history based on the web page 42. When the PC 10 causes the printer 20 to print out the web page 42, the PC 10 refers to the print history table 14*d*, and if the PC 10 determines that a print history of the web page 42 selected as an object to be printed has not been stored in the print history table 14*d*, that is, when the PC 10 first issues a print instruction of the web page 42 selected as an object to be printed (for the first time), the PC 10 creates print data for forming the map 52 on the recording medium 48 together with the coupons 50, as shown in FIG. 2B.

On the other hand, if the PC 10 determines that a print history of the web page 42 selected as an object to be printed has already been stored in the print history table 14*d*, that is, when the PC 10 issues a print instruction of the web page 42 selected as an object to be printed on and after the second time, the PC 10 creates print data that restricts formation of the map 52 by the printer 20.

FIG. 2C is a diagram showing an example of an image formed on the recording medium 48 by the printer 20 in executing a coupon printing process (FIGS. 4A and 4B) with the web page 42 shown in FIG. 2A as an object to be printed, and showing an example of a print result when it is determined that the print history of the web page 42 selected as an object to be printed has already been stored in the print history table 14*d*.

In this case, as shown in FIG. 2C, the PC 10 forms at least two coupons 50, but does not form the map 52 on the recording medium 48. In printing the web page 42 on and after the second time, it is highly likely that a user has already had no necessity of the map 52. Accordingly, in printing the web page 42 on and after the second time, by restricting formation of the map 52, a user can cut down usage of color materials, such as tonner, used to form an image without degrading convenience.

Figure 3A:
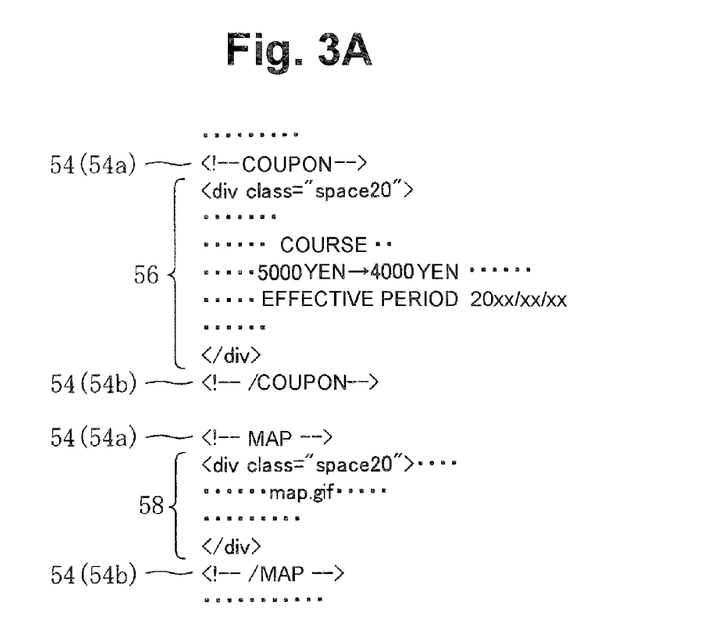
FIG. 3A is an excerpted diagram of a part of HTML data included in web page data.

FIG. 3A is an excerpted diagram of a part of HTML data included in web page data. The HTML data shown in FIG. 3A includes comment lines 54, coupon object data 56 and map object data 58. In the present embodiment, among the comment lines 54, the comment line 54 including a start tag is referred to as a comment start line 54*a*. Further, among the comment lines 54, the comment line 54 including an end tag is referred to as a comment end line 54*b*. The comment line 54 is a note described by a creator of web page data as a memorandum and is not data to be displayed on the web page 42.

The coupon object data 56 includes layout of the coupon object 44 in the web page 42 (FIG. 2A), designation of the width and color of the frame line 44*a*, designation of the size and color of the text 44*b*, and text data constituting the text 44*b*. When the coupon object 44 is formed in an image, the coupon object data 56 includes designation of an image file to be displayed as the coupon object 44.

The map object data 58 includes designation of the layout and size of the map object 46 in the web page 42, designation of an image file to be displayed as the map object 46, and the like. The PC 10 displays in the web page 42 an image file designated with the map object data 58 among image files included in web page data as the map object 46.

An example of the HTML data shown in FIG. 3A describes the coupon object data 56 following the comment start line 54*a* described as a "coupon", followed by the comment end line 54*b*. In addition, map object data 58 is described following the comment start line 54*a* described as a "map", followed by the comment end line 54*b*.

Accordingly, the PC 10 can extract the coupon object data 56 and the map object data 58 from the web page data with these comment lines 54 as a clue. Then, based on the extracted coupon object data 56 and the map object data 58, the PC 10 creates print data and outputs the print data to the printer 20.

Even if a "coupon" or "map" is not described on the comment line 54, when text data or a class name included in the coupon object data 56 includes a character string indicating that it is the coupon object data 56, such as "coupon", the PC 10 can extract the coupon object data 56 from the HTML data with the character string as a clue. Similarly, when an image file name or a class name included in the map object data 58 includes a character string indicating that it is the map object data 58, such as "map", the PC 10 can extract the map object data 58 with the character string as a clue.

Figure 3B:
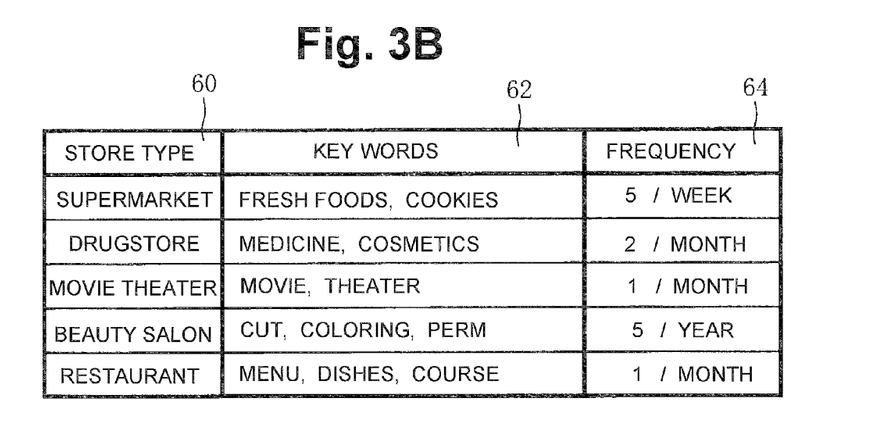
FIG. 3B is a schematic diagram of a configuration of a coupon type table.

FIG. 3B is a schematic diagram showing a configuration of the coupon type table 14*c*. The coupon type table 14*c* is a table for storing use frequency for each type of the coupon object 44 and has a type item 60, a keyword item 62 and a use frequency item 64 (an example of a frequency storage portion) as data items. The type item 60 is an item for storing the types of commercial facilities of coupon issuers, that is, commercial facilities where coupons may be used. The keyword item 62 is an item for storing keywords to identify the types of commercial facilities of coupon issuers in association with the types of commercial facilities. The use frequency item 64 is an item for storing the use frequency of coupons in association with the types of commercial facilities.

When the coupon object 44 includes a keyword stored in the keyword item 62, the PC 10 determines the type of the coupon object 44 (type of the commercial facility of a coupon issuer) based on the keyword, and acquires the use frequency for the determined type stored in the use frequency item 64.

Referring to FIG. 3B, the following description will be provided. For example, when the coupon object 44 includes a keyword "course", the type of the coupon object 44 is determined to be a "restaurant". Then, "once/month" is acquired as use frequency stored for "restaurant".

Next, the PC 10 acquires period information indicating the effective period of the coupon object 44 from the text 44b of the coupon object 44. Next, the PC 10 calculates the number of coupons 50 to be formed on the recording medium 48 from the following equation (1), for example, based on the acquired period information and use frequency.

Number of coupons to be formed on recording medium=Remaining period up to effective period/use frequency  (1)

Wherein, "Remaining period up to effective period" in the above equation (1) is calculated based on the period information of the coupon object 44. If the effective period indicated in the period information of the coupon object 44 is "within X month(s)", for example, the "X month(s)" is calculated as a remaining period up to the effective period. Moreover, if the effective period indicated in the period information of the coupon object is "x (month), y (day)", for example, a period from the present date read from the clock circuit 15 to "x (month), y (day)" is calculated as a remaining period up to the effective period.

Then, the PC 10 creates print data that causes the printer 20 to form calculated number of coupons 50. The PC 10 according to the present embodiment allows the printer 20 to form a suitable number of coupons 50 based on the effective period and type of the coupon object 44.

The coupon type table 14c is configured so that a user may change various setting values, such as the type, keyword and use frequency, as needed. In this way, a suitable number of coupons 50 for the daily habit of the user can be formed by the printer 20.

Figure 4A:
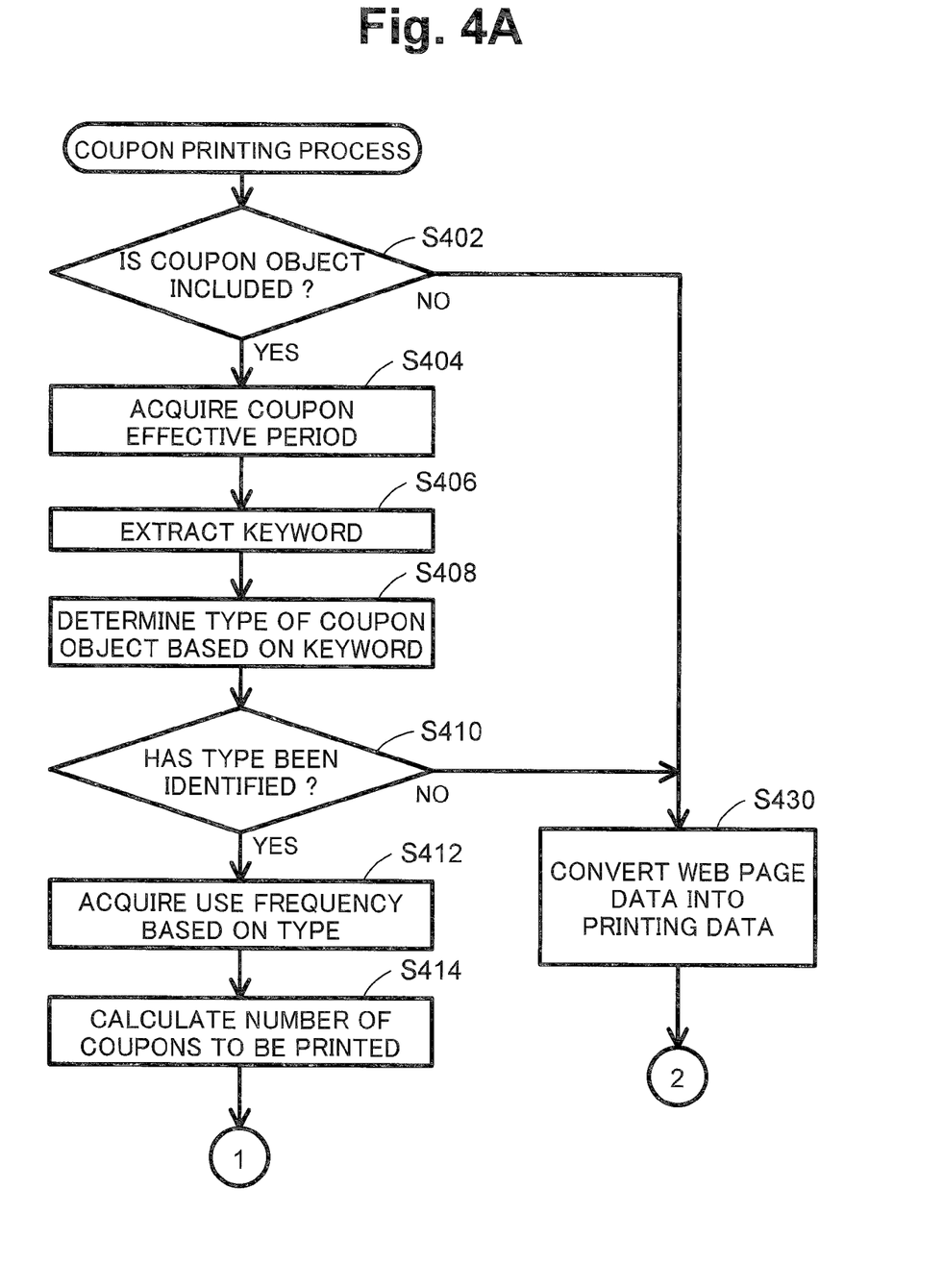
FIGS. 4A and 4B are flowcharts showing the coupon printing process executed by the CPU of the PC.
Figure 4B:
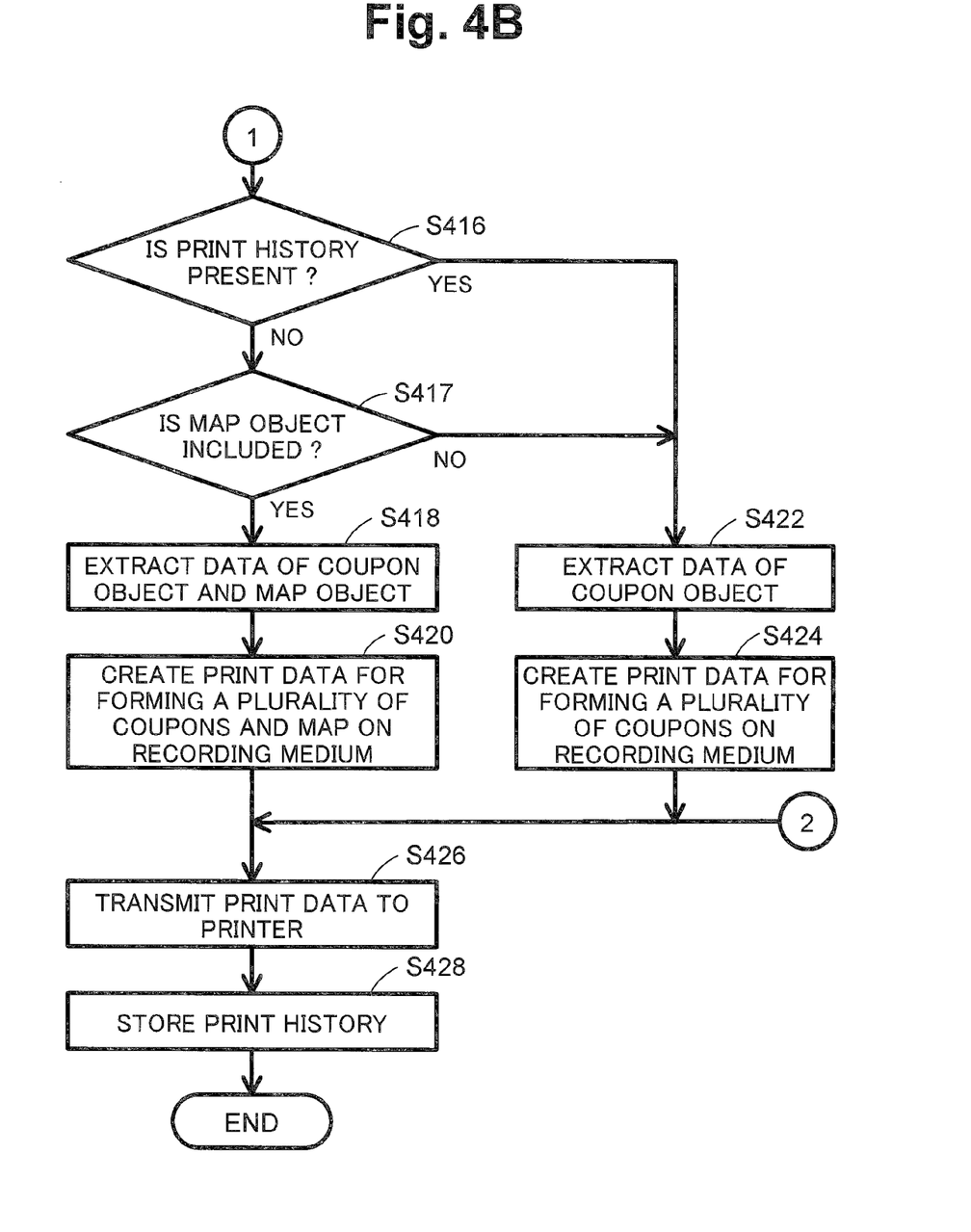

FIGS. 4A and 4B are flowcharts showing a coupon printing process executed by the CPU 11 of the PC 10. The coupon printing process is a process of determining whether or not the web page 42 includes the coupon object 44, and if yes, of controlling the printer 20 to form at least two coupons 50 on the identical recording medium 48, and is executed based on the printer driver 14b. When a printing instruction of the web page 42 shown in the display unit 18 is input from the UI of the browser 14a, the PC 10 starts the coupon printing process.

First, in step S402, the CPU 11 determines whether or not the web page 44 to be printed includes the coupon object 44 (S402), hereinafter the term "step" being omitted. Specifically, it is determined whether or not HTML data (FIG. 3A) that is a source code of the web page 42 includes a character string indicating that the coupon object 44 is included, such as a "coupon".

If it is determined that the web page 42 includes the coupon object 44 (S402: Yes), the CPU 11 next acquires period information indicating the effective period of the coupon object 44 from the HTML data (S404), and extracts a keyword (S406). Then, the CPU 11 determines the type of the coupon object 44 included in the web page 42, based on the extracted keyword (S408). The determination is made based on a correspondence between the type and keyword stored in the coupon type table 14c.

Next, the CPU 11 determines whether or not the type of the coupon object 44 is identified (S410). If the determination in S410 is affirmative (S410: Yes), the CPU 11 acquires the use frequency stored in the use frequency item 64 of the coupon type table 14c for the determined type of the coupon object 44 (S412).

Next, the CPU 11 executes calculation of the above equation (1), based on the use frequency and the period information, to calculate the number of coupons 50 to be formed on the recording medium 48 (S414).

Subsequently, the CPU 11 determines whether or not the print history based on the web page 42 to be printed has already been stored in the print history table 14d (S416). Specifically, it is determined whether or not the URL of the web page 42 to be printed is stored in the print history table 14d.

If the print history based on the web page 42 to be printed has not been stored in the print history table 14d (S416: No), the CPU 11 next determines whether or not the map object 46 is included in the web page 42 (S417). Specifically, it is determined whether or not the HTML data (FIG. 3A) that is a source code of the web page 42 includes a character string indicating that the map object 46 is included, such as a "map".

If it is determined that the web page 42 includes the map object 46 (S417: Yes), the CPU 11 extracts data constituting the coupon object 44 and data constituting the map object 46 from the web page data (S418). In the present embodiment, the coupon object data 56 (FIG. 3A) in the HTML data corresponds to an example of "data constituting the coupon object 44". In addition, the map object data 58 included in the HTML data and an image file designated by the map object data 58 correspond to an example of "data constituting the map object 46". However, when the coupon object 44 is formed from an image file, the coupon object data 56 in the HTML data and an image file designated by the coupon object data 56 correspond to an example of "data constituting the coupon object 44".

Next, the CPU 11 creates print data for forming the number of coupons 50 as calculated in S414, and the map 52 on the identical recording medium 48 based on the data extracted in S418 and stores the data in the print data memory 13b (S420). To contain the number of coupons 50 as calculated in S414, and the map 52 on one recording medium 48, the print data may be processed so that respective coupons 50 are printed out with the size thereof reduced. An upper limit value of the number of coupons 50 to be formed on one recording medium 48 may be preset so that the coupons 50 exceeding the upper limit value are formed on second and subsequent recording media 48.

On the other hand, if it is determined that the print history based on the web page 42 has already been stored in the print history table 14d (S416: Yes) or if it is determined that no map object 46 is included in the web page 42 (S417: No), the CPU 11 extracts data constituting the coupon object 44 (S422). Then, the CPU 11 creates print data for forming the number of coupons 50 as calculated in S414 on the identical recording medium 48 based on the extracted data and stores the data in the print data memory 13b (S424). As shown in S420 as well, the print data may be processed so that respective coupons 50 are printed out with the size thereof reduced. An upper limit value of the number of coupons 50 to be formed on one recording medium 48 may be preset so that the coupons 50 exceeding the upper limit value are formed on second and subsequent recording media 48.

Next, the CPU 11 transmits the created print data to the printer 20 (S426), thereby to form images based on the print data on the recording medium 48 by the printer 20. Subsequently, the CPU 11 stores a URL of the web page 42 to be printed in the print history table 14d as a print history (S428), and finishes this process.

According to the coupon printing process, when a print history based on the web page 42 has not been stored, at least two coupons 50 and the map 52 can be formed on the identical recording medium 48. In addition, when the print history based on the web page 42 has already been stored or when no map object 46 is included in the web page 42 to be printed, a plurality of the coupons 50 can be printed on the identical recording medium 48.

If it is determined that no coupon object 44 is included in the web page 42 (S402: No) or when the type of the coupon object 44 is not identified (S410: No), the CPU 11 converts web page data into print data (S430), transmits the print data to the printer 20 (S426) and causes the printer 20 to form an image corresponding to the web page 42.

In the above embodiment, the Internet 8 corresponds to an example of a network, the PC 10 corresponds to an example of a computer and a printing control apparatus, the printer driver 14b corresponds to an example of a printing control program, the printer 20 corresponds to an example of a printing unit, the coupon type table 14c corresponds to an example of a use frequency storage unit, and the print history table 14d corresponds to an example of a history storage unit. In addition, the coupon object 44 corresponds to an example of an object to be duplicated, the map object 46 corresponds to an example of a related object, the coupon 50 corresponds to an example of a duplicated image of the object to be duplicated, and the map 52 corresponds to an example of the duplicated image of the related object.

The CPU 11 that executes the browser 14a corresponds to an example of a web page display device. The CPU 11 that executes S402 corresponds to an example of an object determination device. The CPU 11 that executes S404 corresponds to an example of a period acquirement device. The CPU 11 that executes S408 corresponds to an example of a type determination device. The CPU 11 that executes S414 corresponds to an example of a calculation device. The CPU 11 that executes S416 corresponds to an example of a storage unit determination device. The CPU 11 that executes S418 or S422 corresponds to an example of a first extraction device. The CPU 11 that executes S418 corresponds to an example of a second extraction device. The CPU 11 that executes S420 or S424 corresponds to an example of a print data creation device. The CPU 11 that executes S426 corresponds to an example of a control device.

Although the present invention has been described above according to the present embodiment, it is easily understood that the present invention is not limited to the embodiment described above and various changes and variations may be made without departing from the spirit or scope of the present invention.

For example, in the above embodiment, the coupon object 44 is exemplified as an example of an object to be duplicated. However, the object to be duplicated is not limited to the coupon object. For example, photo images, character images, logo images and titles of various types of media such as DVDs, name cards, QR codes and the like correspond to an example of the object to be duplicated.

Moreover, in the above embodiment, the map object 46 is exemplified as an example of a related object. However, it is sufficient if the related object is an object that is included in the identical web page to the object to be duplicated, and relates to the object to be duplicated. Herein, the "object relating to the object to be duplicated" means an object showing information that supplements, or is added or attached to information provided by the object to be duplicated. For example, when the object to be duplicated is a coupon, the contact or location of the facility where the coupon may be used may be the related object. When the object to be duplicated is a QR code, the text indicating information stored in the QR code may be the related object.

In the above embodiment, the PC 10 is an example of the computer and the printing control apparatus, and the printer driver 14b is an example of the printing control program. However, when the printer 20 is configured to display a web page, the present invention may be applied by using: the CPU 21 of the printer 20 as an example of a computer and a printing control apparatus; the control program installed in the printer 20 as an example of a printing control program; and the printing unit 27 as an example of a printing unit.

In the above embodiment, when it is determined that printing of a web page is on and after the second time, a duplicated image of the related object (map 52 in the above embodiment) is not formed. However, in place of the above embodiment, by another aspect such as printing out only a duplicated image of a related object in an ink saving mode or making a user select to form the duplicated image of the related object on a recording medium, the formation of the related object may be restricted.

Moreover, in the above embodiment, it is determined whether or not the web page 42 includes an object to be duplicated (coupon object 44 in the above embodiment) based on the HTML data included in the web page data. In place of the above embodiment, the following configuration may be used: Web page data is first converted into print data and the print data is analyzed, thereby to determine whether or not a web page includes an object to be duplicated.

Moreover, in the above embodiment, data corresponding to an object to be duplicated (coupon object 44 in the above embodiment) and data corresponding to a related object (map object 46 in the above embodiment) are extracted from a web page data. In place of the above embodiment, the following configuration may be used: Web page data is first converted into print data, and data corresponding to an object to be duplicated and data corresponding to a related object are extracted from the print data.

Moreover, the above embodiment has been described by taking a case where the web page 42 includes one coupon object 44 as an example; however, the present invention may be applied to a case where a plurality of types of coupon objects 44 are included. In that case, for each coupon object 44, at least two coupons 50 may be formed on the identical recording medium 48.

Moreover, when the period information of an object to be duplicated is not acquired, for example, when an effective period shown in the period information is indefinite, the present invention may be configured to calculate the number of duplicated images of the object to be duplicated to be formed with an established value (e.g. after one year) as the effective period. In addition, the present invention may be configured so that when the period information is not acquired in the above way with a preset maximum number to be disposed on a recording medium, the maximum number is acquired as the number of duplicated images of the object to be duplicated to be formed.

Further, the present invention may be configured so that an upper limit value of the number of duplicated images of an object to be duplicated to be formed by a printing unit is preset by a user.

What is claimed is:

1. A printing control device for controlling a printing unit that forms an image on a recording medium, comprising:
   a web page data acquiring portion configured to access web server on a network and acquire HTML data that is a source code of a prescribed web page from the web server;
   a display configured to display the prescribed web page based on the HTML data acquired from the web server;
   an object determination portion configured to determine, by searching the HTML data, that the prescribed web page displayed by the display includes a duplication object, which is an object to be duplicated, when the HTML data includes a character string indicating that the duplication object is included and while the duplication object is displayed on the display;
a first extraction portion configured to extract data for constituting the duplication object when the object determination portion determines that the prescribed web page includes the duplication object;
a print data creation portion configured to:
create first print data for forming at least two duplicated images of the duplication object on the identical recording medium based on the data extracted by the first extraction portion when the first extraction portion extracts the data for constituting the duplication object; and
create second print data for forming an image of the web page itself based on the web page data when the object determination portion determines that the prescribed web page does not include the duplication object; and
a printing instruction portion configured to instruct the printing unit to:
form a first image on the recording medium based on the first print data created by the print data creation portion when the print data creation portion creates the first print data; and
form a second image on the recording medium based on the second print data created by the print data creation portion when the print data creation portion creates the second print data.

2. The printing control device according to claim 1, further comprising a second extraction portion configured to extract data for constituting a related object relating to the duplication object when the prescribed web page displayed by the display includes the related object,
wherein the print data creation portion is configured to create the print data for forming the at least two duplicated images of the duplication object and an image of the related object on the identical recording medium based on the data extracted by the first extraction portion and the data extracted by the second extraction portion.

3. The printing control device according to claim 2, further comprising:
a history storage portion configured to store a print history of the prescribed web page; and
a history determination portion configured to determine whether or not the print history of the prescribed web page displayed by the display is stored in the history storage portion,
wherein the print data creation portion is configured to create the print data for restricting formation of the image of the related object by the printing unit when the history determination portion determines that the print history of the prescribed web page is stored in the history storage portion.

4. The printing control device according to claim 1, further comprising:
a period acquiring portion configured to acquire period information indicating an effective period of the duplication object; and
a calculation portion configured to calculate a number of the duplicated images of the duplication object to be formed on the recording medium based on the period information acquired by the period acquiring portion, wherein the print data creation portion is configured to create the print data for forming the number, as calculated by the calculation portion, of duplicated images of the duplication object.

5. The printing control device according to claim 4, further comprising:
a frequency storage portion configured to store a frequency of using each type of the duplication object; and
a type determination portion configured to determine the type of the duplication object,
wherein the calculation portion is configured to calculate the number of the duplicated images of the duplication object formed on the recording medium based on the frequency stored in the frequency storage portion corresponding to the type determined by the type determination portion.

6. The printing control device according to claim 1, wherein the duplication object includes a coupon object which is to be printed as a coupon.

7. The printing control device according to claim 2, wherein the related object includes a map object which is to be printed as a map.

8. The printing control device according to claim 1, wherein the printing instruction portion is configured to instruct the printing unit to form the image on the recording medium via the network.

9. A printing control method for controlling a printing unit that forms an image on a recording medium, comprising steps of:
accessing a web server on a network and acquiring HTML data that is a source code of a prescribed web page from the web server;
displaying, on a display, the prescribed web page based on the HTML data acquired from the web server;
determining, by searching the HTML data, that the prescribed web page displayed on the display includes a duplication object, which is an object to be duplicated, when the HTML data includes a character string indicating that the duplication object is included and while the duplication object is displayed on the display;
extracting data for constituting the duplication object when it is determined that the prescribed web page includes the duplication object;
creating first print data for forming at least two duplicated images of the duplication object on the identical recording medium based on the extracted data when the data for constituting the duplication object is extracted;
creating second print data for forming an image of the web page itself based on the web page data when it is determined that the prescribed web page does not include the duplication object;
instructing the printing unit to form first image on the recording medium based on the first print data when the first print data is created; and
instructing the printing unit to form a second image on the recording medium based on the second print data when the second print data is created.

10. A non-transitory computer readable medium storing a computer program which causes, if executed, a processor of a printing control device to perform steps of:
accessing a web server on a network and acquiring HTML data that is a source code of a prescribed web page from the web server;
displaying, on a display, the prescribed web page based on the HTML data acquired from the web server;
determining, by searching the HTML data, that the prescribed web page displayed on the display includes a duplication object, which is an object to be duplicated, when the HTML data includes a character string indicating that the duplication object is included and while the duplication object is displayed on the display;

extracting data for constituting the duplication object when it is determined that the prescribed web page includes the duplication object;

creating first print data for forming at least two duplicated images of the duplication object on the identical recording medium based on the extracted data when the data for constituting the duplication object is extracted;

creating second print data for forming an image of the web page itself based on the web page data when it is determined that the prescribed web page does not include the duplication object;

instructing the printing unit to form a first image on the recording medium based on the first print data when the first print data is created; and instructing the printing unit to form a second image on the recording medium based on the second print data when the second print data is created.

11. The printing control device according to claim 1, wherein the character string indicating that the duplication object is included comprises a comment line in the HTML data.

12. The printing control device according to claim 1, wherein the character string indicating that the duplication object is included comprises text that is not displayed on the prescribed web page.

13. The printing control device according to claim 1, wherein the character string indicating that the duplication object is included comprises text identifying the duplication object.

14. The printing control device according to claim 1, wherein the object determination portion is further configured to:

determine a type of the duplication object when the object determination portion determines that the prescribed web page displayed by the display includes the duplication object; and determine whether the type of the duplication object is identified when the object determination portion determines the type of the duplication object.

15. The printing control device according to claim 14, wherein the print data creation portion is further configured to create the second print data, rather than the first print data, when the object determination portion determines that the type of the duplication object is not identified.

16. The printing control device according to claim 15, wherein the type of the duplication object corresponds to a type of commercial facility that issued the duplication object.

* * * * *